(12) United States Patent
Kimpe (10) Patent No.: US 7,693,090 B1
(45) Date of Patent: Apr. 6, 2010

(54) SYSTEMS AND METHODS FOR DISCOVERING PME BONDING GROUPS

(75) Inventor: Marc Kimpe, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 675 days.

(21) Appl. No.: 11/599,161

(22) Filed: Nov. 14, 2006

Related U.S. Application Data (60) Provisional application No. 60/865,395, filed on Nov. 10, 2006, provisional application No. 60/855,620, filed on Oct. 31, 2006.

(51) Int. Cl.
*H04L 12/28* (2006.01)
*H04L 12/50* (2006.01)

(52) U.S. Cl. ..................................... 370/254; 370/368

(58) Field of Classification Search ................. 370/465, 370/466, 467, 366, 474, 512, 513, 236.2, 370/395.1, 420, 484, 412
See application file for complete search history.

(56) References Cited

U.S. PATENT DOCUMENTS

| | | | |
|---|---|---|---|
| 2001/0043603 A1 | 11/2001 | Yu | |
| 2006/0029103 A1* | 2/2006 | Riess | 370/484 |
| 2006/0215689 A1* | 9/2006 | Liu et al. | 370/465 |
| 2007/0097907 A1* | 5/2007 | Cummings | 370/329 |
| 2008/0259959 A1 | 10/2008 | Zhai | |

OTHER PUBLICATIONS

IEEE Standard 802.3ah, "IEEE Standard for Information Technology, Telecommunications and Information Exchange Between Systems, Local and Metropolitan Area Networks, Specific Requirements, Part 3," Sep. 7, 2004, p. 327-373 and 549-556.

ITU-T Recommendation G.998.2, "Series G: Transmission Systems and Media, Digital Systems and Networks, Ethernet-based Multi-Pair Bonding," Jan. 2005, p. 1-10.

ITU-T Recommendation G.998.2 (2005)—Amendment 1, "Series G: Transmission Systems and Media, Digital Systems and Networks, Ethernet-based Multi-Pair Bonding," Jan. 2005.

\* cited by examiner

*Primary Examiner*—Hanh Nguyen
(74) *Attorney, Agent, or Firm*—Lanier Ford Shaver & Payne, P.C.; Jon E. Holland (57) ABSTRACT

The present disclosure generally pertains to systems and methods for discovering PME bonding groups. In one exemplary embodiment, a plurality of communication links are terminated by physical medium entities (PMEs). In this regard, each link is terminated at one end via a network PME and at another end via a remote PME at a customer premises. Each of the PMEs has a transceiver that is allowed to train during a training phase that precedes a data phase. After training, discovery of PME bonding groups is performed via data communicated over data phase control channels, which are operational while links are operational in the data phase, transmitting data using the Ethernet in the First Mile (EFM) encapsulation. For example, the control channel data may be communicated over a link-level embedded operations channel (EOC). In another example, the control channel data may be communicated using 64/65 Byte (B) code words. In another example, the control channel data may be communicated via an Ethernet operations, administration and maintenance (OAM) channel. In yet another example, the control channel data may be communicated via EFM fragment messaging.

26 Claims, 5 Drawing Sheets

SYSTEMS AND METHODS FOR DISCOVERING PME BONDING GROUPS

CROSS REFERENCE TO RELATED APPLICATIONS

This application claims priority to U.S. Provisional Application No. 60/855,620, entitled "EFM Framing Over DS1 and other non G.hs xDSL," and filed on Oct. 31, 2006, which is incorporated herein by reference. This application also claims priority to U.S. Provisional Application No. 60/865,395, entitled "Systems and Methods for Discovering PME Bonding Groups," and filed on Nov. 10, 2006.

RELATED ART

In current telecommunication networking environments, a network is sometimes coupled to equipment at the same customer premises via a plurality of communication links, such as conductive loops referred to as "twisted pairs." In such circumstances, the multiple links can be aggregated together to form a single, high-speed data channel. The process of aggregating multiple links for forming a high-speed data channel is generally referred to as "bonding."

As an example, data processing logic at a central office (CO) of a telecommunication network may receive a data stream comprising data destined for a customer premises communicatively coupled to the CO via a plurality of links. If the logic is able to determine that there are multiple links servicing this same customer premises that can be bonded together, the data processing logic may divide the data across each of the bonded links. Data processing logic at the customer premises may then assemble the data received from the bonded links into a single data stream for further processing at the customer premises. In such an example, the multiple links servicing the customer premises are bonded together in order to enable a data rate that is faster than what could be achieved over any one of the links. Note that data may be similarly communicated over bonded links from the customer premises to the central office in order to increase the rate at which data is communicated to the central office.

Note that the term "link," as used herein, may refer to one or more subscriber lines extending between the same two transceivers. For example, in ADSL, a single subscriber line is used to communicate between two ADSL transceivers. In such an example, the link over which the ADSL transceivers communicate comprises a single subscriber line. However, in HDSL4, two subscriber lines are used to communicate between the same two HDSL4 transceivers. In such an example, the link over which the HDSL4 transceivers communicate comprises two subscriber lines. Further, a link is terminated by a physical medium entity (PME) at each end. Each PME comprises a transceiver, encapsulation mechanism, and various circuitry for transmitting and receiving packets to and from a link according to known techniques. A group of links, as well as the PMEs terminating the links, that can be bonded together to effectively form a single data channel is referred to as a "PME bonding group."

Note that the bonding of links of a PME bonding group and the bonding of PMEs of a PME bonding group have the same meaning, as used herein. Thus, if multiple links are bonded together, then it can be said that the PMEs terminating such links are bonded. Conversely, if multiple PMEs are bonded together, then it can be said that the links terminated by these PMEs are bonded. Moreover, the phrases "bonding links" and "bonding PMEs" may be used interchangeably throughout this description.

Before bonding of multiple PMEs is attempted, CO data processing logic typically discovers PME bonding groups during training. In other words, during training, CO data processing logic discovers which PMEs are capable of being bonded together. The International Telecommunication Union (ITU) standard G.998.2 and Institute of Electrical and Electronics Engineers (IEEE) standard 802.3ah, sometimes referred to Ethernet in the First Mile ("EFM"), specify current techniques for discovering PME bonding groups for various digital subscriber line (DSL) technologies using ITU G.994.1, G.handshake, sometimes referred to as "G.hs". According to such standards, equipment at a customer premises comprises a write-once register, referred to as "remote discovery register (RDR)." The RDR can be written to only if it is currently cleared (i.e., holds the value of 0). Thus, once the RDR has been written to with a non-zero value, no further writes to the RDR can occur until the RDR is cleared. Further, PMEs that are capable of being bonded together (i.e., PMEs of the same bonding group) share the same RDR.

To discover PME bonding groups, CO data processing logic, during a handshaking sequence defined by EFM using G.hs, transmits a respective identifier, referred to as a "discovery identifier," across each link. In at least some embodiments, different discovery identifies are transmitted across different links such that the same discovery identifier is not transmitted across multiple links. Data processing logic at each customer premises attempts to write the received discovery identifiers to its respective RDR. The first discovery identifier received from a link of a PME bonding group is written to a RDR at a customer premises. The other discovery identifiers received from the remaining links of the same PME bonding group, however, cannot be written to the RDR, since the RDR is a write-once register.

After transmitting the discovery identifiers, the CO data processing logic, via G.hs signals, transmits across each link a request for the contents of the RDR. Each link that returns the same discovery identifier to the CO data processing logic is part of the same PME bonding group. Thus, the CO data processing logic identifies PME bonding groups based on the returned discovery identifiers.

Discovering PME bonding groups via G.hs signals requires a finite amount of time thereby increasing the duration of training. Further, changing which PMEs are actually bonded together typically requires a re-train. Additionally, not all transceivers use G.hs signaling or are G.hs compliant. Therefore, not all transceivers are capable of discovering PME bonding groups pursuant to G.994.1.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for discovering PME bonding groups. In one exemplary embodiment, a plurality of communication links are terminated by physical medium entities (PMEs). In this regard, each link is terminated at one end via a network PME and at another end via a remote PME at a customer premises. Each of the PMEs has a transceiver that is allowed to train during a training phase that precedes a data phase. After training, discovery of PME bonding groups is performed via data communicated over data phase control channels, which are operational while links are operational in the data phase, transmitting data using the Ethernet in the First Mile (EFM) encapsulation. For example, the control channel data may be communicated over a link-level embedded operations channel (EOC). In another example, the control channel data may be communicated using 64/65 Byte (B) code words. In another example, the control channel data may be communicated via an Ethernet operations, administration and maintenance (OAM) channel. In yet another example, the control channel data may be communicated via EFM fragment messaging.

Figure 1:
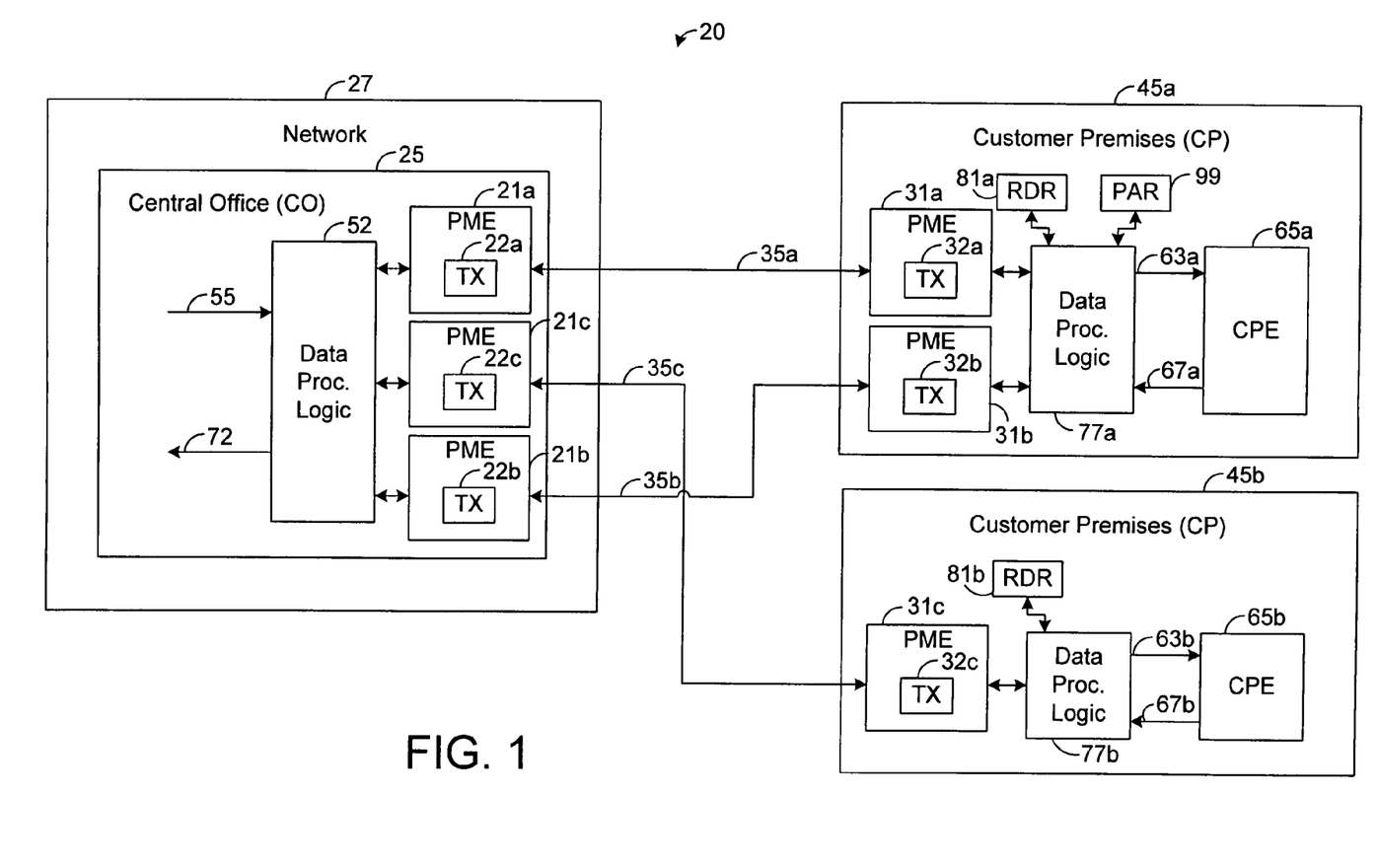
FIG. 1 is a block diagram illustrating an exemplary embodiment of a communication system that performs discovery of PME bonding groups via data phase control channels.

FIG. 1 depicts an exemplary embodiment of a communication system 20. The system 20 of FIG. 1 depicts a plurality of PMEs 21a-c at a central office 25 terminating a plurality of links 35a-c, respectively. Each of the PMEs 21a-c comprises a respective transceiver 22a-c and possibly other circuitry for transmitting and receiving signals via a respective link 35a-c. Each link 35a-c is also respectively terminated by remote PMEs 31a-c residing at customer premises 45a-b. Each of the PMEs 31a-c comprises a respective transceiver 32a-c and possible other circuitry for transmitting and receiving signals via a respective link 35a-c. Each of the links 35a-c can be implemented as one or more pairs of conductive wires (e.g., twisted wire pairs) or some other form of transmission medium. As an example, one link may comprise a single pair of conductive wires and allow bi-directional communication over the pair of conductive wires. In another example, a link may comprise at least two pairs of conductive wires, wherein each pair carries data in only one direction.

For simplicity of illustration, FIG. 1 depicts two of the links 35a-b as extending from the central office 25 to one customer premises 45a and another of the links 35c as extending from the central office 25 to another customer premises 45b. In other embodiments, other numbers of links may extend to either of the customer premises 45a or 45b, and other numbers of customer premises are possible. Indeed, it is common for a central office to have hundreds of links extending therefrom.

In one exemplary embodiment, each of the transceivers 22a-c and 32a-c is a digital subscriber line (DSL) transceiver, such as asymmetric digital subscriber line (ADSL), high-bit-rate digital subscriber line (HDSL), HDSL2, HDSL4, DS1, very-high-data-rate digital subscriber line (VDSL), VDSL2, etc. However, in other embodiments, the transceivers 22a-c and 32a-c can be implemented via other types of known or future-developed transceivers.

In the exemplary embodiment depicted by FIG. 1, data processing logic 52 at the central office 25 receives a data stream 55 comprising data destined for customer premises 45a-b. The data processing logic 52 performs various processing on the data depending on the type of communication employed by the transceivers 22a-c. For example, the data processing logic 52 provides each transceiver 22a-c with the data to be communicated by the respective transceiver 22a-c. The data processing logic 52 also provides the data in a suitable format for transmission by the respective transceiver 22a-c depending on the transceiver type. As an example, for an xDSL transceiver, the data processing logic 52 defines the frames to be transmitted by the transceiver according to applicable protocols and standards. In at least one embodiment, frames, pursuant to EFM standards, are transmitted across each of the links 35a-c, although other protocols may be used in other embodiments. The data processing logic 52 might also fragment the data traffic and send fragments across different links 35a-c. The data processing logic 52 on the other side must then recombine the various fragments received over the various links to reconstitute the original traffic.

Data from the stream 55 destined for equipment at customer premises 45b is interfaced with the transceiver 22c, which transmits such data to the transceiver 32c at the customer premises 45b. The data processing logic 77b at the customer premises 45b recovers the data and transmits a data stream 63b comprising such data to customer premises equipment (CPE) 65b for further processing. In addition, the CPE 65b transmits a data stream 67b comprising data destined for one or more devices (not shown) in communication with the network 27. The logic 77b processes the data, and the transceiver 32c transmits such data to the transceiver 22c at the central office 25. The data processing logic 52 recovers the data and inserts this data into a data stream 72.

Links 35a-b are within the same PME bonding group and can be bonded together to effectively form a single data channel. In this regard, if the links 35a and 35b are bonded together, data from the data stream 55 destined for equipment at the customer premises 45a is processed by the data processing logic 52 such that portions of the data are provided to the transceiver 22a and other portions of the data are provided to the transceiver 22b. The transceiver 22a transmits the received data portions over link 35a to transceiver 32a, and the transceiver 22b transmits the received data portions over the link 35b to transceiver 32b. By using multiple links 35a-b to transmit the data destined for the customer premises 45a, the data can be communicated at a faster rate than would otherwise be possible by transmitting the data across only one of the links 35a or 35b. Data processing logic 77a at the customer premises 45a recovers the data transmitted over the links 35a-b and assembles such data into a single data stream 63a, which is transmitted to CPE 65a at the premises 45a for further processing.

In addition, the CPE 65 transmits a data stream 67a comprising data destined for one or more devices (not shown) in communication with the network 27. The data from the data stream 67a is processed by the data processing logic 77a such that portions of the data are provided to the transceiver 32a and other portions of the data are provided to the transceiver 32b. The transceiver 32a transmits the received data portions over link 35a to transceiver 22a, and the transceiver 32b transmits the received data portions over the link 35b to transceiver 22b. By using multiple links 35a-b to transmit the data to the central office 25, the data can be communicated at a faster rate than would otherwise be possible by transmitting the data across only one of the links 35a or 35b. The data received by the transceivers 22*a-b* from the links 35*a-b* is inserted into the data stream 72.

It should be noted that data processing logic 52, 77*a* and 77*b* can be implemented in software, hardware, or a combination thereof. If portions of the data processing logic 52, 77*a* and/or 77*b* are implemented in software, then at least one instruction execution device, such as a microprocessor, may be used to execute instructions of such software.

In one exemplary embodiment, the data processing logic 52 communicates with the customer premises 45*a-b* via control channels on the links 35*a-c* in order to discover PME bonding groups. Such communication occurs in the data phases of the respective transceivers 35*a-c* so that it can be determined, after training, whether a particular transceiver is connected to a link that can be bonded with other links. Thus, the PME discovery occurs while the transceivers 35*a-c* are transmitting data.

In one exemplary embodiment, the data processing logic 52 determines which links 35*a-c* can be bonded together utilizing write-once registers 81*a-b*, referred to as "remote discovery registers (RDRs)," residing at each of the customer premises 45*a-b*. Exemplary techniques for discovering PME bonding groups using such RDRs will be described in more detail hereinbelow. However, it should be emphasized that other techniques for discovering PME bonding groups based on data transmitted via control channels of the links 35*a-c* are possible in other embodiments.

Each of the RDRs 81*a-b* is configured such that it can be written to only if it is cleared (e.g., storing a 0 value), and the contents of the RDR 81*a-b* are cleared at initialization. Thus, after a non-zero value is written to the RDR 81*a-b*, any future attempts to write to the RDR 81*a-b* will fail until the RDR 81*a-b* is cleared. After clearing the RDR 81*a-b*, the RDR 81*a-b* can be written to again. To ensure that valid data in the RDR 81*a-b* is not overwritten, the RDR 81*a-b* is configured to clear its contents in response to a clear command only if the command includes the value currently stored in the RDR 81*a-b*. In this regard, an RDR 81*a-b* receiving a clear command compares the value in the RDR 81*a-b* to the command and clears its contents only if the value matches a value in the clear command. Accordingly, only an entity that wrote the RDR's current value or is aware of the RDR's current value can clear the RDR 81*a-b*.

For illustrative purposes assume that the transceivers 22*a-c* have completed training and have either begun transmitting data in a data phase or are ready to transmit data in a data phase. In one exemplary embodiment, the data processing logic 52 causes each of the transceivers 22*a-c* to transmit, in the embedded operations channel (EOC), a command, referred to generally as a "write RDR command," instructing a discovery identifier to be written to the RDR at the customer premises that is connected to the respective transceiver 22*a-c*. Included in each write RDR command is the discovery identifier to be written to the RDR. For example, the write RDR command to be transmitted by the transceiver 22*a* includes a first discovery identifier ("identifier 1"), and the write RDR command to be transmitted by the transceiver 22*b* includes a second discovery identifier ("identifier 2"). Further, the write RDR command to be transmitted by the transceiver 22*c* includes a third discovery identifier ("identifier 3"), and each of the discovery identifiers is different.

Figure 2:
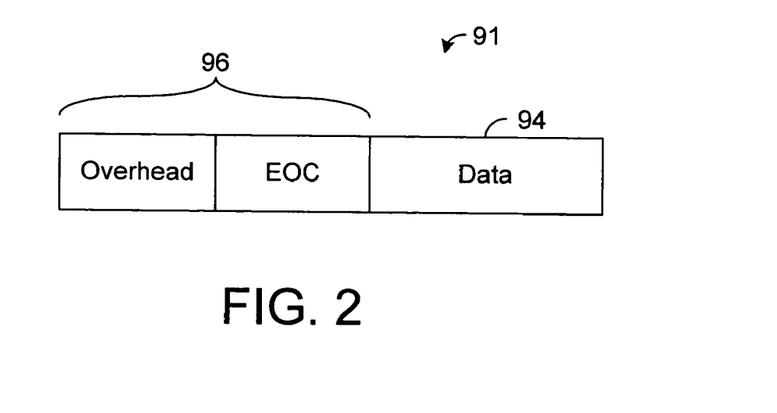
FIG. 2 is a block diagram illustrating an exemplary frame communicated over any of the PMEs of FIG. 1.

The EOC is a link-level channel defined by a portion of each frame transmitted over a link. For example, FIG. 2 depicts an exemplary frame 91 that can be transmitted over any of the links 35*a-c*. The frame 91 comprises a data portion 94 and an overhead portion 96. The data portion 94 includes data, such as data from the stream 55, to be transmitted over the respective link. The overhead portion 96 includes bits that are used for controlling the transmission occurring over the link. Embedded within the frame 91 is an EOC that can be used to communicate various control data, including commands. A write RDR command, as described above, can be inserted into the EOC of at least one frame 91 by the data processing logic 52, and the data processing logic 77*a-b* is preferably configured to recognize the write RDR commands.

The write RDR command including identifier 1 is transmitted in the EOC over link 35*a* by the transceiver 22*a* to the transceiver 32*a*. The data processing logic 77*a*, in response to this command, writes the identifier 1 to the RDR 81*a*. The write RDR command including identifier 2 is transmitted in the EOC over the link 35*b* by the transceiver 22*b* to the transceiver 32*b*. The data processing logic 77*a*, in response to this command, attempts to write the identifier 2 to the RDR 81*a*. However, since identifier 1 is already written to the RDR 81*a*, this second attempt to write to the RDR 81*a* fails. Accordingly, identifier 1 remains in the RDR 81*a*.

The write command including identifier 3 is transmitted in the EOC over link 35*c* by the transceiver 22*c* to the transceiver 32*c*. The data processing logic 77*b*, in response to this command, writes the identifier 3 to the RDR 81*b*. Thus, after completion of the write RDR commands, identifier 1 is stored in RDR 81*a*, and identifier 3 is stored in RDR 81*b*.

Subsequently, the data processing logic 52 causes each of the transceivers 22*a-c* to transmit, in the embedded operations control (EOC), a command, referred to generally as a "read RDR command," instructing retrieval of the value stored in the RDR at the customer premises that is connected to the respective transceiver 22*a-c*. Thus, read RDR commands are transmitted in the EOC channel of each of the links 35*a-c*.

In response to the read RDR command transmitted over link 35*a*, the data processing logic 77*a* retrieves identifier 1 from the RDR 81*a* and causes the transceiver 32*a* to transmit the retrieved identifier 1 in the EOC over the link 35*a*. In response to the read RDR command transmitted over link 35*b*, the data processing logic 77*a* retrieves identifier 1 from the RDR 81*a* and causes the transceiver 32*b* to transmit the retrieved identifier 1 in the EOC over the link 35*b*. In response to the read RDR command transmitted over the link 35*c*, the data processing logic 77*b* retrieves the identifier 3 from the RDR 81*b* and causes the transceiver 32*c* to transmit retrieved identifier 3 over the link 35*c*. Thus, identifier 1 is transmitted over links 35*a-b* to central office 25, and identifier 3 is transmitted over link 35*c* to central office 25.

The data processing logic 52 receives and compares the transmitted discovery identifiers. If a discovery identifier from one PME matches the discovery identifier of another PME, then the two PMEs can be bonded together or, in other words, are part of the same PME bonding group. In the current example, identifier 1 is received from both of the links 35*a-b*, and the data processing logic 52, therefore, determines that links 35*a-b* and PMEs 21*a-b*, 31*a-b* are part of the same PME bonding group and, therefore, can be bonded together. However, the identifier 3 received from the link 35*c* is different than the identifiers received from links 35*a-b*. Thus, the data processing logic 52 determines that the link 35*c* cannot be bonded with either of the links 35*a-b*.

If the data processing logic 52 decides to bond together the links 35*a-b* of the same PME bonding group, then the data processing logic 52 provides notification to the data processing logic 77*a* at the customer premises 45*a*. In one exemplary embodiment, a register 99, referred to as the "PME aggregate register (PAR)," is maintained at the customer premises 45*a* and indicates which of the links 35*a-b* extending from the premises 45*a* are currently bonded together. For example, the PAR 99 may include a plurality of bit values corresponding respectively to the links 35*a-b*. Each of the bit values corresponding to bonded PMEs may be asserted, and the remaining bit values may be deasserted. Thus, the PAR 99 can be examined to determine which of the PMEs have been bonded together.

For illustrative purposes, assume that the data processing logic 52 has decided to bond links 35*a-b*. In such an example, the data processing logic 52 causes the transceiver 22*a* to transmit a command, referred to as "write PAR command," via the EOC over the link 35*a*. Such command includes a value to be written to the PAR 99, and the value is defined such that, when it is written to the PAR 99, the PAR 99 indicates that the links 35*a-b* are bonded together. The transceiver 22*a* transmits such command to the transceiver 32*a* via the EOC over the link 35*a*, and the data processing logic 77*a* writes the value from the command into the PAR 99. Based on the value in the PAR 99, the data processing logic 77*a* is aware that links 35*a-b* are bonded. Thus, both the data processing logic 52 at the central office 25 and the data processing logic 77*a* at the customer premises 45*a* are aware that links 35*a*-35*b* are bonded, and, thereafter, communication occurs over the links 35*a-c* as described above in which data transmitted between the central office 25 and the customer premises 45*a* is divided among the links 35*a-b*.

Note that, if desired, the data processing logic 52 may check the value in the PAR 99 by causing one of the transceivers 22*a* or 22*b* to transmit a command, referred to as "read PAR command," via the EOC. In response to such command, the data processing logic 77*a* reads the PAR 99 and returns the read value via the EOC of one of the links 35*a* or 35*b*.

In addition, in some situations, it may be desirable for the data processing logic 52 to have the ability to clear the remote RDRs. In one exemplary embodiment, this may be achieved by transmitting a command, referred to as a "clear RDR command," via the EOC of a respective link 35*a-c*. As an example, after performing a test for identifying PME bonding groups, it may be desirable to clear the remote RDRs so that another test for identifying PME bonding groups can be later performed. In such an example, the data processing logic 52 may transmit a clear RDR command to each customer premises 45*a-b*. For example, the data processing logic 52 may cause the transceiver 22*a* to transmit a clear RDR command via the EOC of link 35*a*, and the logic 52 may cause the transceiver 22*c* to transmit a clear RDR command via the EOC of link 35*c*. In response to the clear RDR command from link 35*a*, the data processing logic 77*a* clears the RDR 81*a*, and, in response to the clear RDR command from link 35*c*, the data processing logic 77*b* clears the RDR 81*b*. Thus, upon completion of each of the clear RDR commands, each of the RDRs 81*a-b* has been cleared and is ready to be written to.

In an exemplary embodiment described above, the control data for discovering the PME bonding groups are transmitted over the EOC of the links 35*a-c*. In other embodiments, the control data can be transmitted over other control channels. As an example, IEEE 802.3ah standard, "Ethernet in the First Mile," employs 64/65 Byte (B) encapsulation that allows various control data to be communicated from one transceiver to another. Such encapsulation could be used to communicate control data, such as write RDR commands, read RDR commands, write PAR commands, read PAR commands, and clear RDR commands, as described above.

Figure 3:
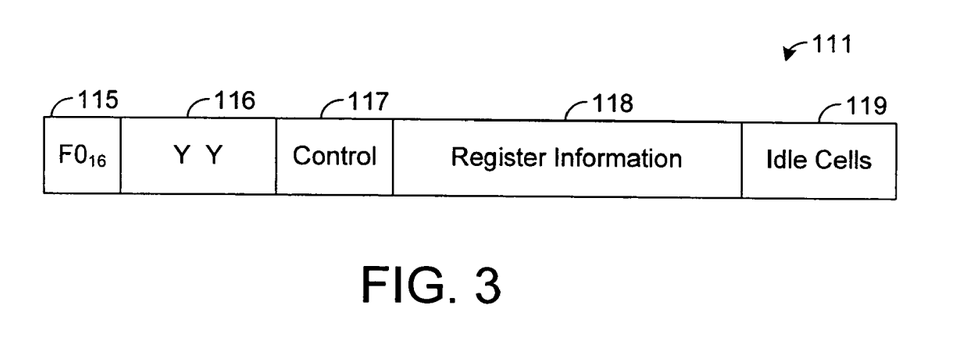
FIG. 3 is a block diagram illustrating an exemplary frame communicated over any of the PMEs of FIG. 1.

For example, commands sent via 64/65B encapsulation could adhere to the format for a frame 111 depicted by FIG. 3. In this regard, the frame 111 of FIG. 3 comprises a sync octet 115 that separates the current frame 111 from the preceding frame being transmitted. The sync octet 115 has a value of F0 in hexadecimal to indicate that the frame 111 includes control data. The frame 111 has a two byte message type field 116 to indicate that the frame 111 pertains to discovery information. In the present example depicted by FIG. 3, the message type field 116 defines the characters YY, but other characters may be used in other examples. The frame 111 also comprises a one byte control field 117 indicative of the type of information being sent. For example, the control field 117 indicates which type of command or response is defined by the frame 111. The control field 117 will be described in more detail hereinbelow.

The frame 111 comprises a register information field 118 that includes control data, such as the value being written to or read from an RDR, if appropriate. In 64/65B encapsulation, each frame is 65 bytes in length with the sync octet 115 occupying one byte of information. 64 bytes may be more than enough space to communicate a discovery message, and the frame 111 may therefore include idle cells 119, as depicted by FIG. 3. These idle cells 119 may be used to communicate various information or may be filled with dummy data (e.g., a random or predefined pattern of 1's and 0's).

Figure 4:
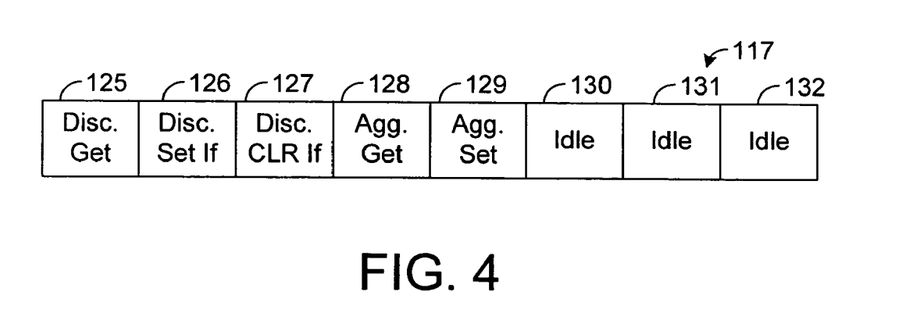
FIG. 4 is a block diagram illustrating an exemplary control field of the frame depicted in FIG. 3.

FIG. 4 depicts an exemplary embodiment of the control field 117, which comprises eight bits 125-132. The bits 125-129 are mutually exclusive in that only one of the bits 125-129 may be asserted. If bit 125 is asserted, then the frame 111 defines a "discovery get" message. Thus, if the frame 111 is being transmitted by a central office transceiver 22*a-c*, then the frame 111 defines a read RDR command, and the register information field 118 may include idle cells similar to the field 119. On the other hand, if the frame 111 is being transmitted by a customer premises transceiver 32*a-c*, the frame 111 is a response to a read RDR command, and the register information field 118 defines the value read from the RDR.

If bit 126 is asserted, then the frame 111 defines a "discovery set if" message. Thus, if the frame 111 is being transmitted by a central office transceiver 22*a-c*, then the frame 111 defines a write RDR command, and the value in the register information field 118 is the discovery identifier to be written to the RDR, if the RDR is currently cleared. On the other hand, if the frame 111 is being transmitted by a customer premises transceiver 32*a-c*, the frame 111 is a response to a write RDR command, and the register information field 118 defines the discovery identifier written by such command.

If bit 127 is asserted, then the frame 111 defines a "discovery clear if" message. Thus, if the frame 111 is being transmitted by a central office transceiver 22*a-c*, then the frame 111 defines a clear RDR command, and the value in the register information field 118 is the value to be compared to the contents of the RDR to determine whether the RDR can be cleared. On the other hand, if the frame 111 is being transmitted by a customer premises transceiver 32*a-c*, the frame 111 is a response to a clear RDR command, and the register information field 118 defines the value compared to RDR contents in performance of such command.

If bit 128 is asserted, then the frame 111 defines an "aggregation get" message. Thus, if the frame 111 is being transmitted by a central office transceiver 22*a-c*, then the frame 111 defines a read PAR command, and the register information field 118 may include idle cells similar to the field 119. On the other hand, if the frame 111 is being transmitted by a customer premises transceiver 32*a-c*, the frame 111 is a response to a read PAR command, and the register information field 118 defines the value read from the PAR.

If bit 129 is asserted, then the frame 111 defines an "aggregation set" message. Thus, if the frame 111 is being transmitted by a central office transceiver 22a-c, then the frame 111 defines a write PAR command, and the value in the register information field 118 is the value to be written to the PAR. On the other hand, if the frame 111 is being transmitted by a customer premises transceiver 32a-b, the frame 111 is a response to a write PAR command, and the register information field 118 may include idle cells similar to the field 119.

It should be noted that the format and syntax of the frame 111 described above are exemplary, and other formats and syntaxes may be used in other examples.

Figure 5:
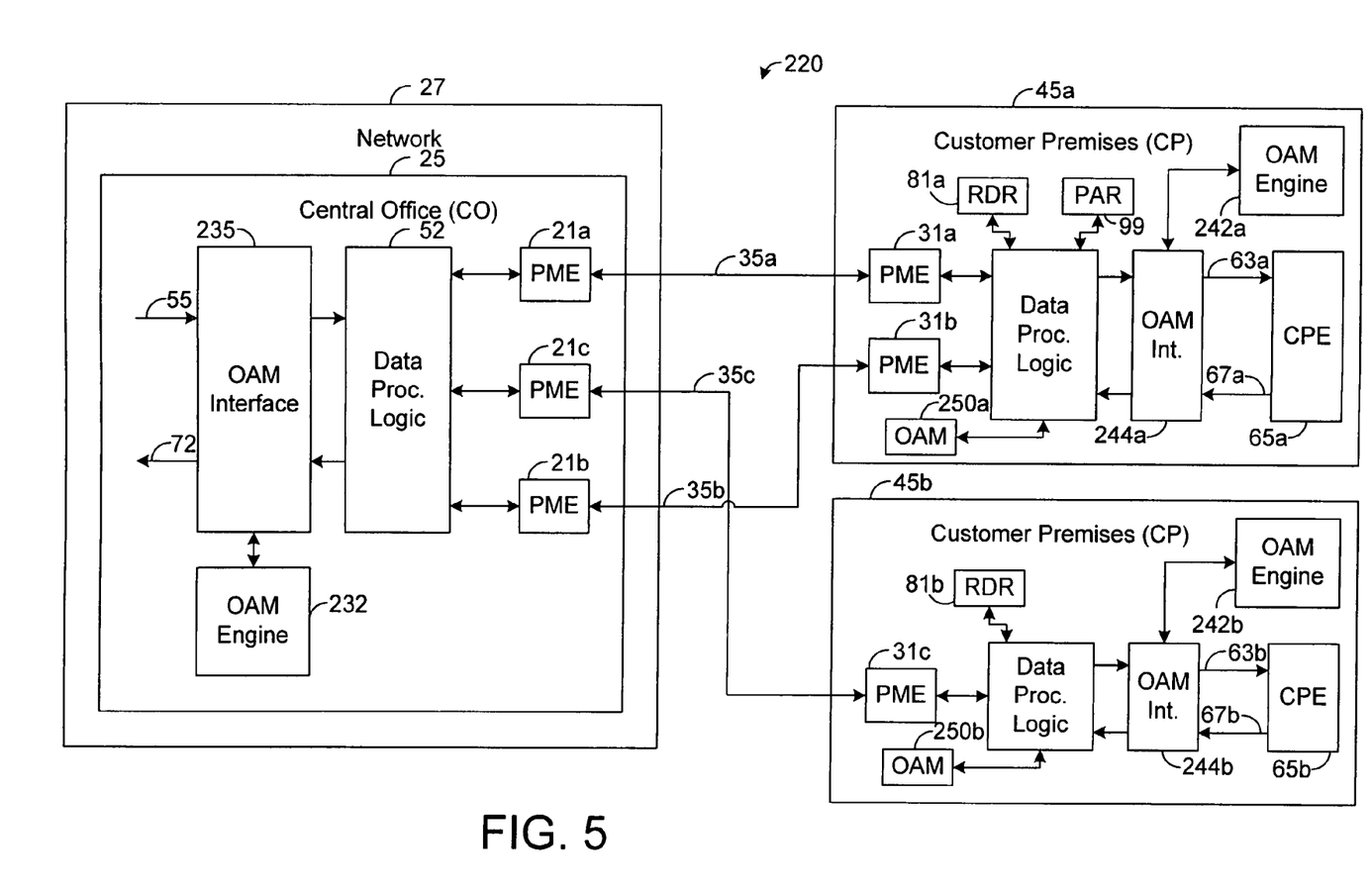
FIG. 5 is a block diagram illustrating an exemplary embodiment of a communication system that performs discovery of PME bonding groups via OAM control channels.

FIG. 5 depicts an exemplary embodiment of a communication system 220 that performs discovery of PME bonding groups via a link operations, administration and maintenance (OAM) channel. In this regard, in the past, OAM engines have been used to communicate various control messages between a central office and CPE. For example, if an OAM engine at a central office desires to discover or set a register value at CPE, the OAM engine generates an OAM message that is inserted into the data stream being communicated to the CPE. Using OAM frames, various commands and other types of messages can be communicated between the CPE and the network. However, if the CPE is serviced by a PME bonding group, an OAM engine typically does not have the ability to specify which of the bonded PMEs are to communicate the OAM message. Thus, in such an embodiment, an OAM message generated by an OAM may be communicated over any of the PMEs in the PME bonding group. The message could also be fragmented into a plurality of fragments with each fragment being sent over a different link 35a-c.

As shown by FIG. 5, the system 220 comprises an OAM engine 232 and an OAM interface 235 at the central office 25. Similarly, an OAM engine 242a-b and an OAM interface 244a-b are respectively included at each customer premises 45a-b, as shown by FIG. 5. The OAM engines 235 and 242a-b can be implemented in hardware, software, or a combination thereof. The OAM engines 232 and 242a-b are configured to generate messages, such as write RDR commands, read RDR commands, write PAR commands, read PAR commands, and clear RDR commands, as described above for discovering PME bonding groups, as well as responses to these commands. With each message, the generating OAM engine 232 or 242a-b is configured to provide an identifier that specifies which of the PMEs and, therefore, links 35a-c is used to communicate the message. Thus, techniques similar to those previously described above can be used to discover PME boning groups, as will be described in more detail hereafter with reference to FIG. 6.

However, as noted above, conventional communication systems have not generally been configured to allow an OAM engine to specify which PME of a bonded group of PMEs is to be used to communicate an OAM message. In one exemplary embodiment, an OAM register 250a-b is respectively implemented at each customer premises 45a-b. A value in the OAM register 250a-b indicates whether the OAM engine 242a-b has the ability to specify which PME is to communicate OAM messages generated by the OAM engine 242a-b. Note that the ability to specify which PME within a bonded group of PMEs is to communicate OAM messages will be referred to herein as "per PME messaging." Thus, if an OAM engine 242a-b has the ability to specify which PME within a bonded group of PMEs is to communicate OAM messages, then the corresponding OAM register 250a-b (i.e., the OAM register at the same premises) indicates that per PME messaging is enabled. If the OAM engine 242a-b does not have the ability to specify which PME within a bonded group of PMEs is to communicate OAM message, then the corresponding OAM register 250a-b indicates that per PME messaging is disabled.

The OAM register 250a-b is accessed during training to determine whether discovery of PME bonding groups is performed during training. If the OAM register 250a-b indicates that per PME messaging is disabled, then discovery of PME bonding groups is performed during training. Otherwise, the discovery of PME bonding groups is skipped during training and performed during the data phase via the OAM channel.

An exemplary operation and use of the system 220 depicted by FIG. 5 will now be described with specific reference to FIG. 6.

Figure 6:
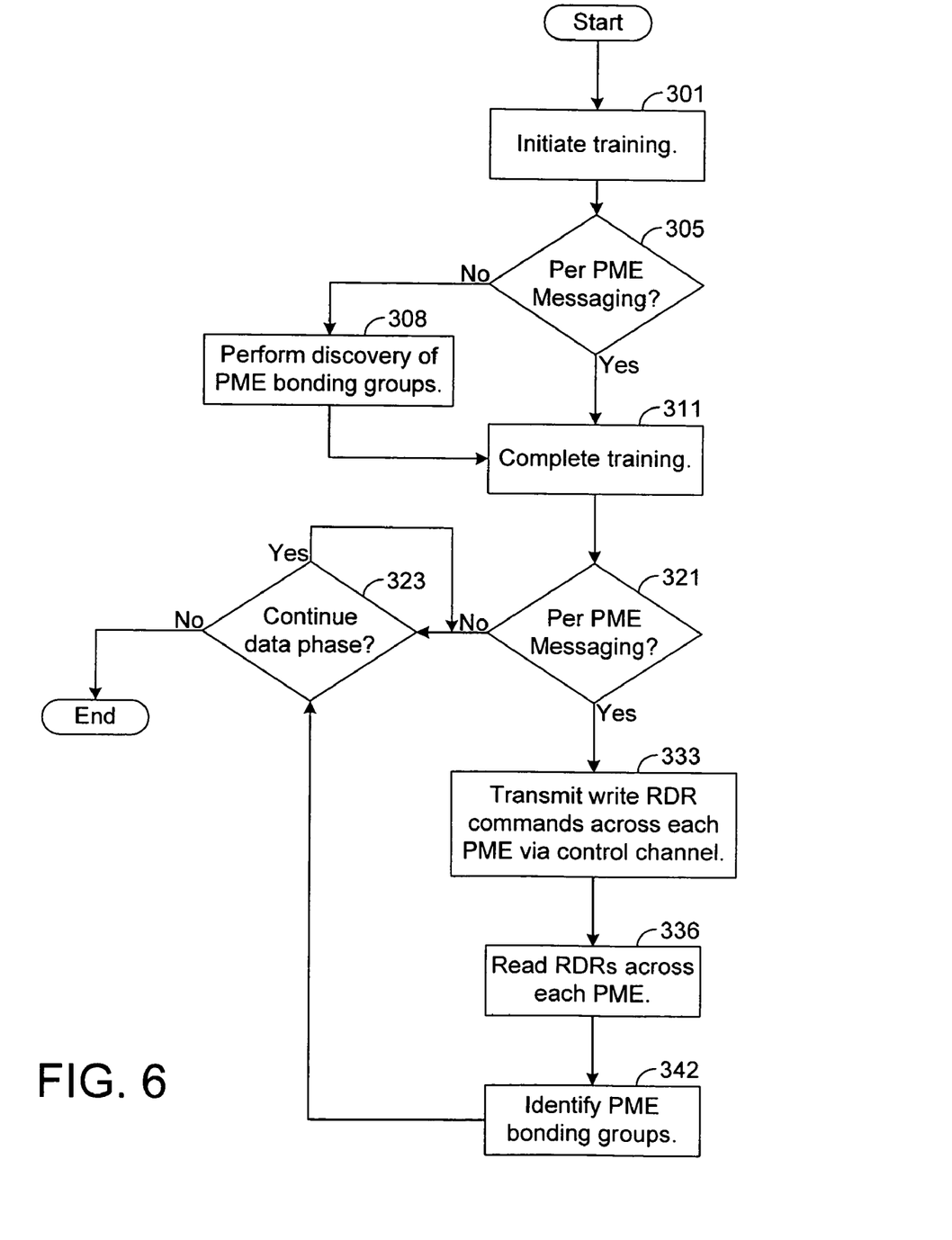
FIG. 6 is a block diagram illustrating an exemplary method for performing discovery of PME bonding groups.

At the beginning of a communication session between the central office 25 and customer premises 45a, the transceivers 22a-b and 32a-b enter a training phase, as depicted by block 301 of FIG. 6. During the training phase, the data processing logic 52 determines whether per PME messaging is enabled, as shown by block 305 of FIG. 6. For example, handshake signals, such as G.hs signals, are used in one embodiment to discover the value of the OAM register 250a during initialization, although other a priori techniques for determining whether PME messaging is enabled are possible in other examples. If a priori techniques are used to determine whether PME messaging is enabled, blocks 305 and 308 can be skipped.

Moreover, if the value from register 250a indicates that per PME messaging is enabled, then the OAM engine 242a has the ability to control whether an OAM message is communicated over link 35a or link 35b. If the value indicates that per PME messaging is disabled, then the discovery of PME bonding groups is performed during training, as indicated by block 308 of FIG. 6. For example, the discovery of PME bonding groups may be performed via G.hs signals according to G.994.1. However, if per PME messaging is enabled, then block 308 is skipped and training continues until completion, as indicated by block 311.

If the OAM register 250a indicates that per PME messaging is disabled, then discovery of PME bonding groups was performed during training, and the data phase is entered and continued until completion, as indicated by blocks 321 and 323. However, if the OAM register 250a indicates that per PME messaging is enabled, then discovery of PME bonding groups is performed after training. In this regard, upon completion of training, the OAM engine 232 transmits a write RDR command for each link 35a-c coupled to the central office 25, as indicated by block 333.

Thus, the OAM engine 232 transmits a write RDR command to the OAM interface 235. The write RDR command includes a PME identifier that identifies the PME 21a thereby indicating that the write RDR command is to be transmitted over link 35a. The write RDR command also includes a discovery identifier to be written in an RDR if the write RDR command is successfully executed by CPE. Note that the discovery identifier may be the PME identifier that is used to select the link 35a for transmission so that a separate identifier for the RDR and the PME is unnecessary. The OAM interface 235 receives the write RDR command and inserts this command in the data stream 55. Upon receiving the write RDR command, the data processing logic 52 defines an OAM frame that includes the discovery identifier to be written into the RDR, and the data processing logic 52 appropriately sets bits in the OAM frame to indicate that this frame is an OAM frame and defines a write RDR command. Based on the PME identifier specifying the PME 21a and, therefore, link 35a, the data processing logic 52 ensures that the OAM frame is transmitted by the transceiver 22a of PME 21a over link 35a to the transceiver 32a of PME 31a.

Upon receiving the OAM frame, the data processing logic 77a transmits the write RDR command to the OAM interface 244a, which transmits the write RDR command to the OAM engine 242a for further processing. The OAM engine 242a then writes the discovery identifier in the command to the RDR 81a.

The OAM engine 232 transmits another write RDR command to the OAM interface 235. The write RDR command a PME identifier that identifies the PME 21b thereby indicating that the write RDR command is to be transmitted over link 35b. The write RDR command also includes a discovery identifier to be written in an RDR if the write RDR command is successfully executed by CPE. Note that the discovery identifier may be the PME identifier that is used to select the link 35b for transmission so that a separate identifier for the RDR and the PME is unnecessary. The OAM interface 235 receives the write RDR command and inserts this command in the data stream 55. Upon receiving the write RDR command, the data processing logic 52 defines an OAM frame that includes the discovery identifier to be written into the RDR, and the data processing logic 52 appropriately sets bits in the OAM frame to indicate that this frame is an OAM frame and defines a write RDR command. Based on the PME identifier specifying the PME 21b and, therefore, link 35b, the data processing logic 52 ensures that the OAM frame is transmitted by the transceiver 22b of PME 21b over link 35b to the transceiver 32b or PME 31b.

Upon receiving the OAM frame, the data processing logic 77a transmits the write RDR command to the OAM interface 244a, which transmits the write RDR command to the OAM engine 242a for further processing. The OAM engine 242a then attempts to write the discovery identifier in the command to the RDR 81a. However, since the RDR 81a has previously been written in response to the write RDR command transmitted over link 35a, the current attempt to write the discovery identifier transmitted over link 35b fails. Thus, the discovery identifier transmitted over link 35a remains in the RDR 81a.

The OAM engine 232 transmits yet another write RDR command to the OAM interface 235. The write RDR command includes a PME identifier that identifies the PME 21c thereby indicating that the write RDR command is to be transmitted over link 35c. The write RDR command also includes a discovery identifier to be written in an RDR if the write RDR command is successfully executed by CPE. Note that the discovery identifier may be the PME identifier that is used to select the link 35c for transmission so that a separate identifier for the RDR and the PME is unnecessary. The OAM interface 235 receives the write RDR command and inserts this command in the data stream 55. Upon receiving the write RDR command, the data processing logic 52 defines an OAM frame that includes the discovery identifier to be written into the RDR, and the data processing logic 52 appropriately sets bits in the OAM frame to indicate that this frame is an OAM frame and defines a write RDR command. Based on the PME identifier specifying the PME 21c and, therefore, link 35c, the data processing logic 52 ensures that the OAM frame is transmitted by the transceiver 22c or PME 21c over link 35c to the transceiver 32c of PME 31c.

Upon receiving the OAM frame, the data processing logic 77b transmits the write RDR command to the OAM interface 244b, which transmits the write RDR command to the OAM engine 242b for further processing. The OAM engine 242b then writes the discovery identifier in the command to the RDR 81b.

After transmitting the write RDR commands, the OAM engine 232 reads the RDRs across each link 35a-c, as indicated by block 336 of FIG. 6. In this regard, the OAM engine 232 transmits a read RDR command for each link 35a-c coupled to the central office 25.

Thus, the OAM engine 232 transmits a read RDR command to the OAM interface 235. The read RDR command includes a PME identifier that identifies the PME2 21a thereby indicating that the read RDR command is to be transmitted over link 35a. The OAM interface 235 receives the read RDR command and inserts this command in the data stream 55. Upon receiving the read RDR command, the data processing logic 52 defines an OAM frame, and the data processing logic 52 appropriately sets bits in the OAM frame to indicate that this frame is an OAM frame and defines a read RDR command. Based on the PME identifier specifying the PME 21a and, therefore, link 35a, the data processing logic 52 ensures that the OAM frame is transmitted by the transceiver 22a of PME 21a over link 35a to the transceiver 32a of PME 31a.

Upon receiving the OAM frame, the data processing logic 77a transmits the read RDR command to the OAM interface 244a, which transmits the read RDR command to the OAM engine 242a for further processing. The OAM engine 242a then reads the RDR 81a, and transmits a response OAM message that includes the discovery identifier read from the RDR 81a. The OAM message also includes a PME identifier that identifiers PME 31a thereby indicating that the message is to be transmitted over the same link 35a over which the read RDR command was transmitted. Note that the PME identifier in the response message may be the same PME identifier in the command that prompted the response message. The OAM interface 244a receives the OAM message and inserts this message in the data stream 67a. Upon receiving the OAM message, the data processing logic 77a defines an OAM frame that includes the discovery identifier read from the RDR 81a, and the data processing logic 77a appropriately sets bits in the OAM frame to indicate that this frame is an OAM frame and defines a response to a read RDR command. Based on the PME identifier specifying the PME 31a and, therefore, link 35a, the data processing logic 77a ensures that the OAM frame is transmitted by the transceiver 32a of PME 31a over link 35a to the transceiver 22a of PME 21a.

Upon receiving the OAM frame, the data processing logic 52 transmits the OAM message to the OAM interface 235, which transmits the OAM message to the OAM engine 232 for further processing. The OAM engine 232 stores the discovery identifier from the message.

Via similar techniques, the OAM engine 232 reads the contents of the OAM register 81a over the link 35b (both a read RDR command and a response to this command are transmitted over link 35b), and the OAM engine 232 reads the contents of the OAM register 81b over the link 35c (both a read RDR command and a response to this command are transmitted over link 35c). Based on the RDR identifiers read via the read RDR commands transmitted in block 336, the OAM engine 232 identifies at least one PME bonding group, as indicated by block 342.

In the instant example, the discovery identifiers read via links 35a-b match each other but not the discovery identifier read via link 35c. Thus, the OAM engine 232 determines that links 35a-b define a PME bonding group and that link 35c is not a member of this group. The OAM logic 232 then communicates this determination to the data processing logic 52, which uses this information to bond links 35a-b so that both links 35a-b are simultaneously used, as effectively a single data channel, for communication occurring between the central office 25 and the customer premises 45a.

Note that at least some of the functionality described above as being performed by the OAM engine 232 may be performed by the data processing logic 52. For example, the data processing logic 52, 77a, and/or 77b may be configured to transmit and/or process at least some of the OAM frames described above without involving any OAM engine. Indeed, the process of using the OAM channel to discover PME bonding groups may be transparent to the OAM engines 232, 244a, and/or 244b, if desired. Moreover, unless otherwise specified, the term "logic," in a general sense, shall refer to any of the components 52, 77a, 77b, 232, 242a, and/or 242b, unless otherwise specified herein.

Figure 7:
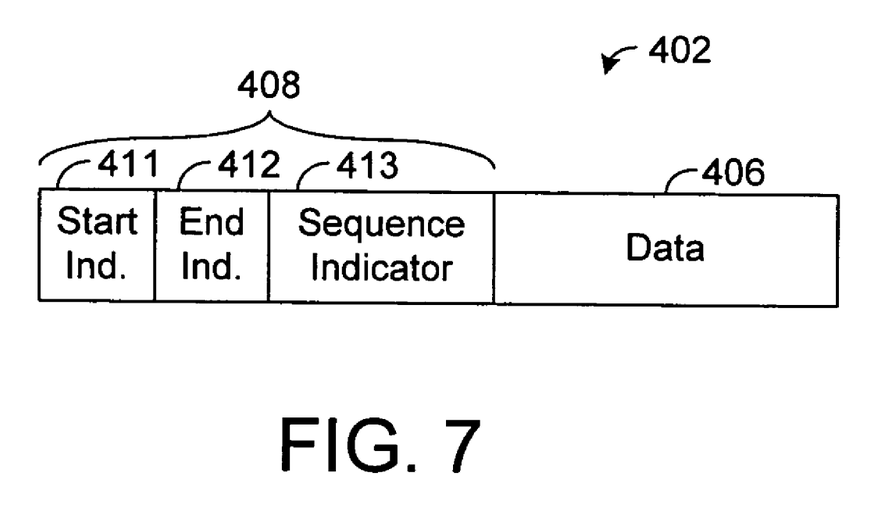
FIG. 7 is a block diagram illustrating an exemplary EFM fragment communicated over any of the PMEs of FIG. 1.

In at least one embodiment, EFM fragments communicated by the PMEs are used to define a control channel by controlling the sequence indicators in the EFM fragments to indicate when the fragment comprises control data. In this regard, when the data processing logic 52 receives a packet to be communicated via at least one of the links 35a-c, the data processing logic 52 may fragment the packet to define a plurality of EFM fragments that can be communicated over multiple links and reassembled at a customer premises to re-create the original packet received by the logic 52. FIG. 7 depicts an exemplary EFM fragment 402. The fragment 402 comprises a data portion 406 and an overhead portion 408. The overhead portion 408 comprises a start indicator 411, an end indicator 412, and a sequence indicator 413. The start indicator 411 is a one bit indicator indicating whether the data portion 406 of the fragment 402 defines the start of the original packet before fragmentation. The end indicator 412 is a one bit indicator indicating whether the data portion 406 of the fragment 402 defines the end of the original packet before fragmentation. The indicators 411 and 412 may have other bit lengths in other embodiments.

The sequence indicator 406 is a multi-bit value indicating the data portion's sequence within the original packet so that the data can be assembled in the proper order at the receiving end to properly re-create the original packet. In one embodiment, the EFM fragment 402 is used for communicating control data for discovering PME bonding groups. For example, the data portion 406 may be used to define a command, such as a write RDR command, read RDR command, write PAR command, read PAR command, and clear RDR command, as described above. Thus, EFM fragments could be used to discover PME bonding groups according to techniques similar to those previously described above.

Note that certain sequence values could be used to indicate whether the fragment 402 comprises control data, such as control data for discovering PME bonding groups. As an example, a value of zero in the sequence indicator 413 may indicate that the fragment 402 comprises control data. In other examples, other sequence values may indicate the presence of control data. Further, the value of the sequence indicator 413 may indicate the type of message being sent via the fragment 402 similar to the manner that the control field 117 of FIG. 3 indicates the type of message being sent. Alternatively, the data portion 406 may indicate the type of message being sent.

As an example, assume that the data processing logic 52 is configured to discover PME bonding groups according to techniques described above by using write RDR commands and read RDR commands. When the logic 52 desires to transmit a write RDR command over a particular link, such as link 35a, for example, the logic 52 transmits the command via an EFM fragment 402. In this regard, the logic 52 sets the sequence indicator 413 to a value, such as zero, to indicate to the data processing logic 77a that the fragment comprises control data. The data processing logic 52 also sets the data in the data portion 406 to define a write RDR command.

Upon receiving the fragment 402, the data processing logic 77a, based on the sequence indicator 413, is aware that the fragment 402 comprises control data. Thus, rather than attempting to assemble the data portion 406 with data portions 406 of other fragments, the data processing logic 77a complies with the command defined by the data portion 406. Note that other commands, such as read RDR commands, may be transmitted by the data processing logic 52 in a similar fashion. In addition, the data processing logic 77a may similarly use EFM fragments to transmit control messages to the data processing logic 52. Furthermore, EFM fragments may be similarly used to communicate control data, such as control data for discovering PME bonding groups, between the data processing logic 52 and the data processing logic 77b at other customer premises 45b. Note that the overhead portion 408 may comprise information other than or in addition to the exemplary overhead information indicated above. In addition, it is possible for information in the overhead portion 408 other than or in addition to the sequence indicator 413 to be used to indicate whether the fragment 402 comprises control data.

It should be noted that the embodiments described above are exemplary, and it would be apparent to one of ordinary skill in the art, upon reading this disclosure, that various modifications of the above described embodiments are possible.

The invention claimed is:

1. A communication system, comprising:
a plurality of network physical media entities (PMEs) terminating a plurality of links, each of the network PMEs configured to communicate with a respective remote PME via a respective one of the links;
memory for storing bonding group data indicating which of the PMEs are in a PME bonding group; and
logic configured to communicate control data via at least one control channel over at least one of the links, during a data phase for the at least one link, using Ethernet in the First Mile (EFM) encapsulation, the control data indicating whether the at least one of the PMEs is in the PME bonding group, the logic further configured to discover the PME bonding group based on the control data and to update the bonding group data based on the control data, the logic further configured to bond a plurality of PMEs of the PME bonding group based on the updated bonding group data.

2. The system of claim 1, wherein each of the links comprises at least one communication connection extending between a respective one of the network PMEs and a respective one of the remote PMEs.

3. The system of claim 1, wherein the logic is configured to communicate a portion of the control data via an EFM fragment.

4. The system of claim 3, wherein the EFM fragment comprises a sequence indicator, and wherein the sequence indicator indicates that the EFM fragment comprises control data.

5. The system of claim 3, wherein the fragment comprises an overhead portion indicating whether the EFM fragment comprises control data, the overhead portion comprising a sequence indicator.

6. The system of claim 1, wherein the at least one data phase control channel comprises an operations, administration and maintenance (OAM) channel.

7. The system of claim 1, wherein the control data is received from the at least one link by at least one of the PMEs of the PME bonding group.

8. A communication system, comprising:
a plurality of network physical media entities (PMEs) terminating a plurality of links, each of the network PMEs configured to communicate with a respective remote PME via a respective one of the links; and
logic configured to communicate control data via at least one control channel over at least one of the links, during a data phase for the at least one link, using Ethernet in the First Mile (EFM) encapsulation, the logic further configured to discover a PME bonding group based on the control data and to bond a plurality of PMEs of the PME bonding group based on the control data, wherein the at least one control channel comprises a link-level embedded operations channel (EOC).

9. A communication system, comprising:
a plurality of network physical media entities (PMEs) terminating a plurality of links, each of the network PMEs configured to communicate with a respective remote PME via a respective one of the links; and
logic configured to communicate control data via at least one control channel over at least one of the links, during a data phase for the at least one link, using Ethernet in the First Mile (EFM) encapsulation, the logic further configured to discover a PME bonding group based on the control data and to bond a plurality of PMEs of the PME bonding group based on the control data, wherein the logic is configured to communicate the control data via the at least one data phase control channel over the at least one link using 64/65 Byte (B) encapsulation.

10. A communication system, comprising:
a plurality of network physical media entities (PMEs) terminating a plurality of links, each of the network PMEs configured to communicate with a respective remote PME via a respective one of the links; and
logic configured to communicate control data via at least one control channel over at least one of the links, during a data phase for the at least one link, using Ethernet in the First Mile (EFM) encapsulation, the logic further configured to discover a PME bonding group based on the control data and to bond a plurality of PMEs of the PME bonding group based on the control data, wherein the at least one control channel comprises and operations, administration and maintenance (OAM) channel, wherein the plurality of network PMEs comprise a first network transceiver, wherein the first network transceiver is configured to transmit a portion of the control data via the OAM channel during the data phase, and wherein the logic is configured to make a determination, in a training phase for the at least one link, as to whether per PME messaging is enabled over the OAM channel.

11. The system of claim 10, wherein the determination is based on G.hs signaling.

12. The system of claim 10, wherein the logic is configured to control whether the PME bonding group is discovered in the training phase based on the determination.

13. A communication system, comprising:
a plurality of network physical media entities (PMEs) terminating a plurality of links, each of the network PMEs configured to communicate with a respective remote PME via a respective one of the links; and
logic configured to communicate control data via at least one control channel over at least one of the links, during a data phase for the at least one link, using Ethernet in the First Mile (EFM) encapsulation, the logic further configured to discover a PME bonding group based on the control data and to bond a plurality of PMEs of the PME bonding group based on the control data, wherein the plurality of network PMEs comprise a first network transceiver, wherein the first network transceiver is configured to transmit a portion of the control data via the at least one control channel in the data phase, and wherein the logic is configured to make a determination, in a training phase for the at least one link, whether discovery of PME bonding groups over the at least one control channel is enabled.

14. The system of claim 13, wherein the logic is configured to control whether discovery of PME bonding groups is performed during the training phase based on the determination.

15. The system of claim 13, wherein the determination is based on G.hs signaling.

16. A communication system, comprising:
a plurality of network physical media entities (PMEs) terminating a plurality of links, each of the network PMEs configured to communicate with a respective remote PME via a respective one of the links; and
logic configured to communicate control data via at least one control channel over at least one of the links, during a data phase for the at least one link, using Ethernet in the First Mile (EFM) encapsulation, the logic further configured to discover a PME bonding group based on the control data and to bond a plurality of PMEs of the PME bonding group based on the control data, wherein the logic is configured to associate at least a portion of the control data with an identifier to identify which of the network PMEs is to communicate the portion.

17. A communication method, comprising the steps of:
communicating data over a plurality of links, each of the links terminated by a respective network physical media entity (PME) and a respective remote PME;
storing, in memory, bonding group data indicating which of the PMEs are in a PME bonding group;
communicating control data via at least one control channel over at least one of the links, during a data phase for the at least one link, using Ethernet in the First Mile (EFM) encapsulation, the control data indicating whether the at least one of the PMEs is in the PME bonding group;
discovering the PME bonding group based on the control data;
updating the bonding group data based on the discovering step; and
bonding a plurality of PMEs of the PME bonding group based on the updated bonding group data.

18. The method of claim 17, wherein the communicating the control data step comprises the step of communicating the control data via an operations, administration and maintenance (OAM) channel.

19. The method of claim 17, further comprising the steps of:
receiving a data packet; and
fragmenting the data packet into a plurality of EFM fragments,
wherein the communicating the control data step comprises the step of transmitting a portion of the control data via one of the EFM fragments.

20. The method of claim 19, further comprising the step of determining that the one EFM fragment comprises control data based on a sequence indicator of the one EFM fragment.

21. The method of claim 17, further comprising the step of receiving the control data from the at least one link via at least one of the PMEs of the PME bonding group.

22. A communication method, comprising the steps of:
communicating data over a plurality of links, each of the links terminated by a respective network physical media entity (PME) and a respective remote PME;
communicating control data via at least one control channel over at least one of the links, during a data phase for the at least one link, using Ethernet in the First Mile (EFM) encapsulation;
discovering a PME bonding group based on the control data; and
bonding a plurality of PMEs of the PME bonding group based on the discovering step,
wherein the communicating the control data step comprises the step of communicating the control data via a link-level embedded operations channel (EOC).

23. A communication method, comprising the steps of:
communicating data over a plurality of links, each of the links terminated by a respective network physical media entity (PME) and a respective remote PME;
communicating control data via at least one control channel over at least one of the links, during a data phase for the at least one link, using Ethernet in the First Mile (EFM) encapsulation;
discovering a PME bonding group based on the control data; and
bonding a plurality of PMEs of the PME bonding group based on the discovering step,
wherein the communicating the control data step comprises the step of communicating the control data via 64/65 Byte (B) encapsulation.

24. A communication method, comprising the steps of:
communicating data over a plurality of links, each of the links terminated by a respective network physical media entity (PME) and a respective remote PME;
communicating control data via at least one control channel over at least one of the links, during a data phase for the at least one link, using Ethernet in the First Mile (EFM) encapsulation;
discovering a PME bonding group based on the control data;
bonding a plurality of PMEs of the PME bonding group based on the discovering step; and
associating at least a portion of the control data with an identifier identifying which PME is to communicate the portion.

25. A communication method, comprising the steps of:
communicating data over a plurality of links, each of the links terminated by a respective network physical media entity (PME) and a respective remote PME;
communicating control data via at least one control channel over at least one of the links, during a data phase for the at least one link, using Ethernet in the First Mile (EFM) encapsulation;
discovering a PME bonding group based on the control data;
bonding a plurality of PMEs of the PME bonding group based on the discovering step, wherein the plurality of PMEs comprise a first network transceiver, and wherein the communicating the control data step comprises the step of communicating a portion of the control data via the first network transceiver in the data phase;
communicating training signals via the first network transceiver in a training phase that precedes the data phase; and
determining whether discovery of PME bonding groups via the first transceiver during the data phase is enabled based on the training signals.

26. The method of claim 25, wherein the training signals are G.hs compliant.

* * * * *